Aug. 16, 1966

H. WOLFE 3,267,418

SYSTEM FOR MEASUREMENT OF ELECTRICAL
CONDUCTIVITY OF FLUIDS

Filed Oct. 14, 1963

INVENTOR.
HALLEY WOLFE

BY

*V.C. Muller*

ATTORNEY.

United States Patent Office 3,267,418
Patented August 16, 1966

3,267,418
SYSTEM FOR MEASUREMENT OF ELECTRICAL
CONDUCTIVITY OF FLUIDS
Halley Wolfe, La Canada, Calif., assignor to the United
States of America as represented by the Secretary of
the Navy
Filed Oct. 14, 1963, Ser. No. 316,166
1 Claim. (Cl. 340—4)

The invention described herein may be manufactured and used by or for the Government of the United States of America for governmental purposes without the payment of any royalties thereon or therefor.

The present invention relates generally to measurement of liquid characteristics, relates more particularly to a method and means for discovering recent vessel passage through a seawater region, and further relates to an improved system for measurement of seawater electrical conductivity.

The invention basically concerns measurement of liquid electrical conductivity variations and of the associated characteristic of liquid temperature, and thus presents widespread applicability. For example, the measurement of seawater in continuous manner as by a ship moving along a charted course is useful in providing valuable oceanographic data. The invention is directly intended for use in connection with antisubmarine warfare operations and will therefore be described principally with reference to such application.

Prior art target-sensing methods for determining the presence of submarines in the seawater universe have not been entirely satisfactory, principally from the standpoint of detection range limitations. Taking sonar technique by way of example, determination of the presence of a submarine, in a seawater region surrounding a vessel forming a possible target of that submarine, is dependent strictly upon detection, by that vessel (or by a convoying vessel), of underwater signals received either directly or by reflection from the submarine, in accordance with the use of either passive or active type of sonar; such technique thus poses serious limitations upon the maximum range at which presence of a submerged submarine can be ascertained, for underwater signal strength deteriorates rapidly with transmission distance and signal detection capability is limited by background noise. Wake detection techniques, however, while not per se providing direct indications of submarine direction or directly enabling pursuit action, make it possible to determine submarine presence in a seawater region of very much larger extent for the reason that water perturbations which identify submarine wakes tend to persist for considerable periods after submarine passage.

It is an object of the present invention to provide an improved method and means for detection of submarine wakes.

It is another object of the invention to provide a vessel wake detection system wherein the wake-defining characteristics are the differing size distribution and the greater variation in temperature, relative to that in unperturbed water, exhibited by thermal patches or "spheres" encountered in the vessel wake.

It is a further object to provide an improved system for determination of electrical conductivity and conductivity variations of seawater and other fluids.

Other objects, advantages and novel features of the invention will become apparent as the same becomes better understood by reference to the following detailed description when considered in conjunction with the accompanying drawing wherein.

Figure 1:
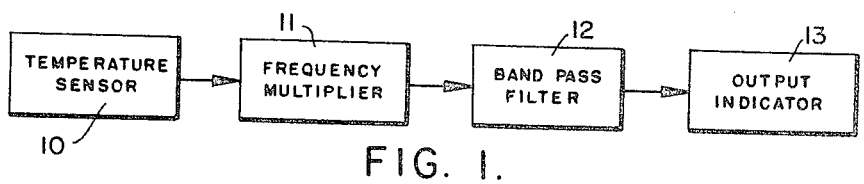
FIG. 1 illustrates in block diagram form an exemplary system, in accordance with the present invention, employing a seawater temperature sensing apparatus, for enabling recognition of vessel wakes.

In accordance with the present invention, the method and means for detection of seawater perturbations such as occur in submarine wakes, and correspondingly the determination of submarine presence, are based upon the findings that, in the ocean universe of submarines, there are thermal inhomogeneities taking the form of adjacent spheres of water which differ in temperature, that, in undisturbed seawater regions, the mean diameter of these spheres is of the order of two feet, the spheres are smoothly distributed in size and spacing, and the temperature fluctuations encountered by a vessel moving through the thermal structures are of the order of 0.2° Fahrenheit, and that as a result of submarine passage the larger spheres are broken into smaller ones such that, even though the gross temperature of the wake may be unchanged, the spectral character and magnitudes of the encountered temperature variations are significantly modified, the spectral distribution favoring the smaller spheres and the temperature variations being significantly increased.

The invention will be better understood by reference to the drawing wherein each of the units may be of entirely conventional character, and wherein like reference characters are used throughout to designate like or corresponding parts.

Referring first to the schematic block diagram of an exemplary system embodying the invention as illustrated in FIG. 1, temperature sensor 10 represents any suitable apparatus, carried by a submerged vessel (not shown) proceeding at a predetermined speed, and operating to sense seawater temperature and to provide a voltage having magnitude and frequency characteristics in accordance with the temperature variations encountered as a function of time at that speed. It will be understood in view of the previously mentioned findings that the spectral character of the resultant voltage is dependent upon the size distribution of the temperature inhomogeneities. Apparatus for spectral analysis of the resultant voltage, to provide an indication of whether the carrier vessel passage is through undisturbed water or through a submarine wake, is here shown in simplified block diagram form as comprising no more than a frequency multiplier 11 for increasing the comparatively low frequencies of the resultant voltage to higher frequencies more practical of analysis or examination, a filter 12 having a bandpass characteristic selected to encompass an upper band of the multiplier output signal frequencies to thus pass a greater amount of energy under wake conditions and effectively accomplish such analysis or examination, and an output indicator 13 of any suitable type which may, if desired, include a threshold circuit and an alarm mechanism for audibly signaling passage into a wake.

Figure 2:
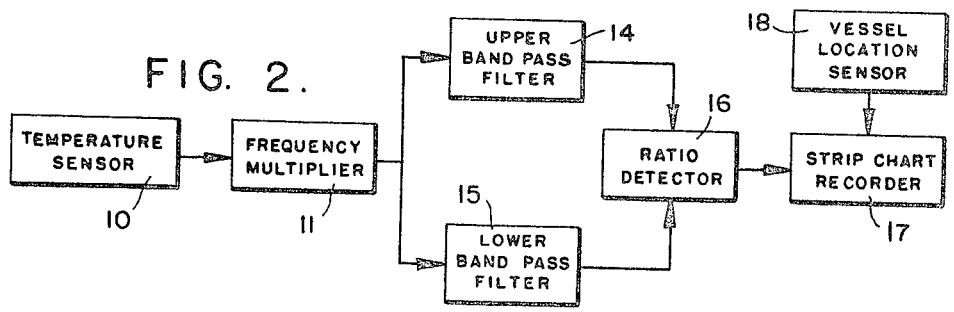
FIG. 2 illustrates a modification of the FIG. 1 system.

It will be apparent that the described basic system is capable of many modifications. By way of example, another technique for spectral analysis, in effect, to distinguish between wake and non-wake conditions, would be to employ the ratio of the energy at the higher frequencies to that at the lower frequencies. This can be accomplished as illustrated in FIG. 2, wherein temperature sensor 10 and frequency multiplier 11 operate as in the FIG. 1 system, and wherein upper and lower bandpass filters 14 and 15, respectively, and ratio detector 16, operate to provide an energy-ratio voltage corresponding to the ratio of higher frequency to lower frequency energies found in the resultant waveform of voltage delivered by frequency multiplier 11. Ratio detector 16 may be utilized to deliver its ratio voltage simply to some form of an output indicator such as mentioned in description of the FIG. 1 version of a wake-detector system, or, as here indicated, to a multiple-trace strip chart recorder 17 to which may also be applied, from any conventional type of vessel location sensor 18, the carrier vessel location which may include vessel depth; strip chart recorder 17 would preferably also contain a so-called event marker for providing a time-mark base for the several traces.

The temperature-sensing device to be employed in sensor 10 of the FIG. 1 and FIG. 2 systems may take any one of a variety of forms, but should be fast-acting, and capable of extended use without having its characteristics substantially affected as by the corrosive action of seawater upon the device or by accretion of plankton or other organisms. A seawater electrical conductivity (and correspondingly, temperature) measuring technique, e.g., would satisfy the fast-response requirement but, if conventionally employing electrodes immersed in seawater, would be undesirable in practice because of corrosion and accretion effects. The improved form of seawater electrical conductivity measuring device represented in FIG. 3, however, has been found to be stable and quite suitable for extended use in the sensor 10 of the FIG. 1 and FIG. 2 wake detection systems and for measurement of liquid conductivity in general.

Figure 3:
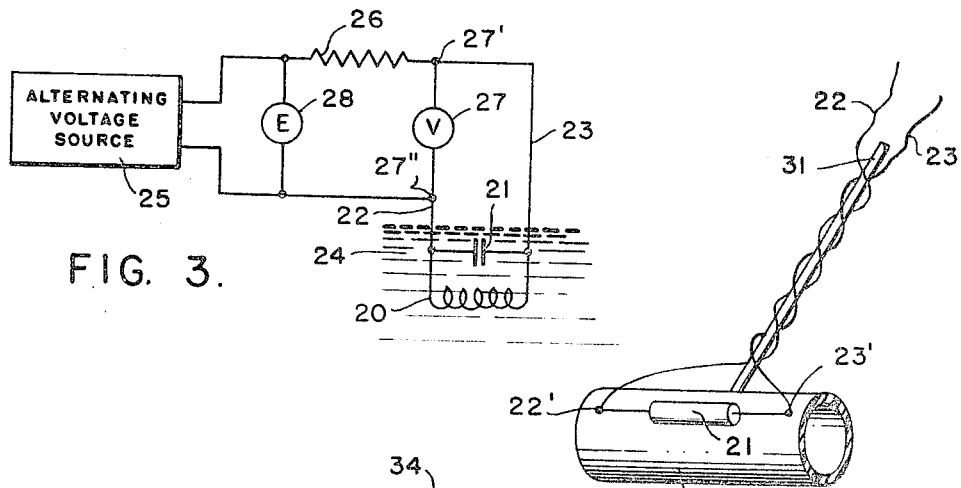
FIG. 3 represents schematically a novel apparatus for measuring electrical conductivity of seawater or other liquid.

Referring to FIG. 3, tubular inductor 20 and shunting capacitor 21, likewise the connecting leads 22 and 23, immersed in the seawater 24, are to be understood as completely and hermetically insulated so that there can be no direct electrical contact to the seawater. Inductor 20 and capacitor 21 are supplied with alternating voltage from constant voltage source 25 through series resistor 26 and via leads 22 and 23, at the normal resonance frequency of the parallel LC circuit. However, eddy current generation in the seawater (taking place because of seawater conductivity and the alternating magnetic field of the inductor) detunes the LC circuit from resonance, the degree of eddy current generation and of the detuning effect corresponding to the electrical conductivity of the seawater. The current through resistor 26, a function of the detuning effect, is thus a measure of the seawater conductivity and correspondingly of the seawater temperature. The difference between the voltages E and V, or the voltage V alone in a preferred instance wherein the voltage E as supplied by source 25 is constant, therefore provides a measure of the seawater temperature. If the inductor and capacitor were ideal (i.e., infinite Q, no losses or dissipation) and if the seawater were of infinite specific resistivity (zero specific conductivity), then the LC circuit would have infinite impedance and the voltage V read by voltmeter 27 would remain the same as the source voltage E read by voltmeter 28. However, since the resistivity of seawater has finite value, then the impedance of the LC circuit is reduced (the Q of the inductor is reduced) along with the voltage V across it. Thus, voltage V is a measure of the conductivity (and temperature) of the seawater or other liquid in which the inductor is immersed; the higher the conductivity of the liquid, the lower would be the voltage reading V.

Figure 4:
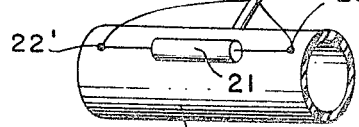
FIG. 4 illustrates in general manner a probe structure which may form a part of the FIG. 3 apparatus.

While FIG. 3 merely illustrates inductor 20 and capacitor 21 schematically, it will be understood that in practice they are provided in suitable probe structure form. By way of example, tubular inductor 20 may be of multilayer unspaced-turn construction and provided with or embedded in an insulating coating, indicated at 30 in FIG. 4, supported by a probe rod 31 extending from the carrier vessel (not shown). The shunting capacitor 21 and its connections to terminals 22' and 23' of the inductor as indicated in FIG. 4 are likewise to be understood as hermetically sealed against water entry.

Figure 5:
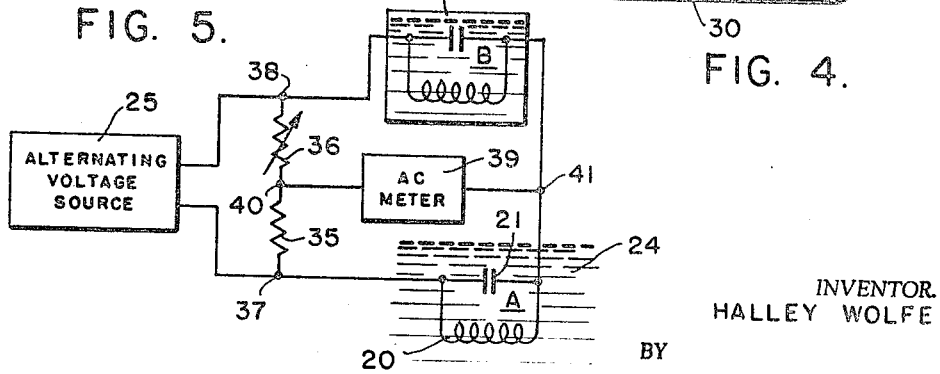
FIG. 5 illustrates a modification of the FIG. 3 apparatus.

The electrical conductivity measuring technique and apparatus which is merely shown exemplarily in FIG. 3 may of course be embodied in other and much more sensitive forms. Again by way of simplified example, a conductivity measuring system, based upon the same Q-variation or LC circuit detuning principles as above but making use of a bridge circuit having greater sensitivity and capable of detecting extremely small changes in seawater conductivity, is illustrated in FIG. 5, wherein $\underline{A}$ designates the probe circuit and a like LC circuit $\underline{B}$ is mounted in a tank 34 of sampled seawater maintained at approximately the gross temperature of the surrounding seawater. Resistors 35 and 36, the latter being adjustable for initial bridge-balancing purposes, and the LC circuits $\underline{A}$ and $\underline{B}$, form the arms of the bridge circuit, alternating voltage from source 25 in this instance being supplied to junctions 37 and 38, and the indicating meter 39 (or other utilization circuit) correspondingly being connected between the remaining junctions 40, 41.

It will be understood that for use in the FIG. 1 and FIG. 2 systems wherein sensors 10 must deliver, to frequency multiplier 11, an alternating voltage corresponding in amplitude and frequency to the time-based variations of seawater conductivity or temperature, each of the liquid conductivity measuring devices shown in FIGS. 3 and 5 would be employed in association with a coupling or demodulation circuit comprising a rectifier and low-pass filter designed to eliminate the carrier voltage corresponding to that generated by source 25 and to pass the modulation frequencies and amplitudes resulting from temperature variations in the seawater region under test. Such coupling circuit would of course receive its input signal from terminals 27' and 27" of the FIG. 3 circuit or, similarly, from terminals 40, 41 of the FIG. 5 circuit. It will likewise be understood that the inductor Q-variation or resonance detuning principles basic to the conductivity measuring systems illustrated in FIGS. 3 and 5 may be employed in other circuits or with other bridge balancing techniques; in the FIG. 5 bridge circuit, e.g., initial bridge balancing can be accomplished by adjustment of the capacitor element of circuit $\underline{B}$, or circuit B and the associated sampled seawater tank 34 may be eliminated in favor of a variable network adjustable to duplicate the average characteristics presented by the immersed detuned circuit $\underline{A}$, and correspondingly adjustable to secure initial bridge balance conditions.

Having described distinct embodiments to facilitate an understanding of underlying principles of the present invention, it will now be apparent that many other modifications and variations are possible without departing from the invention. It is therefore to be understood that within the scope of the appended claims the invention may be practiced otherwise than as specifically described.

What is claimed is:

An apparatus for measuring finite fluctuations in temperature along a path of motion in a body of ocean seawater relative to the gross temperature of the surrounding water, said apparatus comprising:

(a) a first tuned unit comprising an inductor L and capacitor means C shunting said inductor, yielding an LC circuit exhibiting parallel resonance at a predetermined frequency;

(b) said first tuned unit being hermetically insulated for submersion, without deleterious effect, for movement through said body of water;

(b–1) a second tuned unit comprising an inductor L' and capacitor means C' shunting said inductor, yielding an LC circuit exhibiting parallel resonance at said predetermined frequency;

(b–2) said second tuned unit being submersed in a sample of said ocean water maintained at a reference temperature equal to said gross temperature;

(c) a signal frequency generator for providing at its output an A.C. signal at said predetermined frequency;

(d) said first and second tuned units being connected with first and second reference impedances to form a four-leg impedance bridge, said bridge forming two pairs of opposite corners, the output of said signal frequency generator being applied across one pair of said opposite corners;

(e) output means responsive to the amplitude of an A.C. signal at said predetermined frequency connected across the other pair of opposite corners;

whereby movement of the first tuned unit through zones at which the ocean water temperature, and therefore the water conductivity, differs finitely from the gross temperature of the surrounding water, and detunes said first tuned unit, and thereby produces corresponding amplitude fluctuation at said other pair of opposite corners of the four-leg bridge to actuate the output means.

References Cited by the Examiner

UNITED STATES PATENTS

| | | | |
|---|---|---|---|
| 2,642,477 | 6/1953 | Puranen et al. | 324—6 |
| 2,902,639 | 9/1959 | Thayer et al. | 324—62 X |
| 3,151,292 | 9/1964 | Orr | 324—5 X |
| 3,214,728 | 10/1965 | Higgins | 340—4 |

CHESTER L. JUSTUS, *Primary Examiner.*

R. A. FARLEY, *Assistant Examiner.*